US012263900B1

(12) United States Patent
Ueno et al.

(10) Patent No.: US 12,263,900 B1
(45) Date of Patent: Apr. 1, 2025

(54) LEGGED ROBOT WITH ELECTROSTATIC DISCHARGING ASSEMBLY AND ROBOT LEG

(71) Applicants: ANYBOTICS AG, Zürich (CH); PETROLIAM NASIONAL BERHAD (PETRONAS), Kuala Lumpur (MY)

(72) Inventors: Taihei Ueno, Zürich (CH); Ayla Watsuji, Zürich (CH); Mehmet Mutlu, Dietikon (CH); Joël Schlienger, Zürich (CH)

(73) Assignees: ANYBOTICS AG, Zurich (CH); PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 0 days.

(21) Appl. No.: 18/834,677

(22) PCT Filed: Feb. 1, 2022

(86) PCT No.: PCT/EP2022/052325
§ 371 (c)(1),
(2) Date: Jul. 31, 2024

(87) PCT Pub. No.: WO2023/147841
PCT Pub. Date: Aug. 10, 2023

(51) Int. Cl.
*B25J 19/06* (2006.01)
*B62D 57/032* (2006.01)

(52) U.S. Cl.
CPC ............ *B62D 57/032* (2013.01); *B25J 19/06* (2013.01)

(58) Field of Classification Search
CPC ................................ B62D 57/032; B25J 19/06
See application file for complete search history.

(56) References Cited

U.S. PATENT DOCUMENTS

| | | | |
|---|---|---|---|
| 7,024,276 B2 * | 4/2006 | Ito ........................... | G06N 3/008 318/568.15 |
| 7,308,336 B2 * | 12/2007 | Takenaka ............... | B62D 57/02 901/1 |

(Continued)

FOREIGN PATENT DOCUMENTS

| | | |
|---|---|---|
| EP | 1637050 A1 | 3/2006 |
| JP | 2003153702 A | 5/2003 |
| JP | 2018069374 A | 5/2018 |

OTHER PUBLICATIONS

Chen et al., Electroadhesive feet for turning control in legged robots, 2016, IEEE, p. 3806-3812 (Year: 2016).*

(Continued)

*Primary Examiner* — McDieunel Marc
(74) *Attorney, Agent, or Firm* — MARSHALL, GERSTEIN & BORUN LLP; Michael P. Furmanek (57) ABSTRACT

A legged robot (1001) comprising a first leg (1) and a second leg (2) adapted to walk the robot over a ground (g). The first leg (1) comprises a first electrostatic discharge assembly comprising: a first electrostatic discharge contact (13) connected to a first electrostatic chargeable robot component (100), a first electrostatic discharge member (12) extending along the first leg (1), and a first electrostatic discharge foot (11). The first electrostatic discharge assembly is adapted to electrostatically discharge the first robot component (100) via the first electrostatic discharge contact (13) to the first electrostatic discharge member (12) to the first electrostatic discharge foot (11) and to the ground (g).

10 Claims, 3 Drawing Sheets

(56) References Cited

U.S. PATENT DOCUMENTS

| | | | | |
|---|---|---|---|---|
| 7,319,918 B2* | 1/2008 | Takenaka | ............. | B62D 57/032 |
| | | | | 901/1 |
| 7,379,789 B2* | 5/2008 | Takenaka | ............. | B62D 57/032 |
| | | | | 901/1 |
| 7,386,364 B2* | 6/2008 | Mikami | ................ | B62D 57/02 |
| | | | | 318/568.22 |
| 7,664,569 B2* | 2/2010 | Shimizu | ............... | B62D 57/032 |
| | | | | 901/1 |

OTHER PUBLICATIONS

Cordes et al., Towards an Intelligent Foot for Walking and Climbing Robots, 2010, IEEE, p. 1225-1232 (Year: 2010).*
Honda et al., Walking mechanism for a lion-type robot, 2014, IEEE, p. 3403-3406 (Year: 2014).*
Filho et al., A four legged walking robot with obstacle overcoming capabilities, 2013, IEEE, p. 374-379 (Year: 2013).*
International Preliminary Report on Patentability and Written Opinion for Application No. PCT/EP2022/052325 mailed Aug. 15, 2024.
International Search Report corresponding International Application No. PCT/EP2022/052325, mailing date Sep. 9, 2022.
Written Opinion, corresponding International Application No. PCT/EP2022/052325, mailing date Sep. 9, 2022.

* cited by examiner

LEGGED ROBOT WITH ELECTROSTATIC DISCHARGING ASSEMBLY AND ROBOT LEG

CROSS-REFERENCE TO RELATED APPLICATION

This is the United States national phase of International Patent Application No. PCT/EP2022/052325, filed Feb. 1, 2022, the entire contents of which are hereby incorporated by reference herein.

TECHNICAL FIELD

The invention refers to a legged robot, in particular a quadruped robot, comprising an electrostatic discharging assembly. In addition, the invention refers further to a robot leg comprising the electrostatic discharging assembly.

BACKGROUND ART

Legged robots are used for various tasks, in particular for supporting human work in hazardous environments. Usually, a legged robot comprises one or more legs, wherein each leg ends in a foot.

To use a legged robot in an explosive environment, it is advantageous if the robot is constructed to fulfil some precaution measures. For example, the robot should be constructed in a way that it is not explosive itself and does not promote explosions in such an environment.

One challenge in this regard is to construct the robot in such a way that it does not become electrostatically charged. Electrostatic charging can happen due to electrical circuits arranged within the robot, but also due to friction of the robot with the ground, e.g. with a carpet ground, or due to friction against wind.

Typically, robots as known in prior art, are using electrostatic discharge wires to discharge the robot housing and its components. Therefore, a dedicated wire is connecting the robot with the ground.

Anyway, such a discharging wire is not practically for a robot working in a harsh environment. The wire might easily break off or might deform such that it does not stay in touch with the ground. In addition, the legs of the robot might easily entangle with such a wire during operation of the robot.

DISCLOSURE OF THE INVENTION

The problem to be solved by the present invention is therefore to provide a legged robot that is adapted to work in a harsh environment and comprises measures to prevent electrostatic charging.

This problem is solved by the legged robot according to a first aspect of the present invention and a robot leg according to the second aspect of the invention.

Unless otherwise stated, the following definitions shall apply in this specification:

The terms "a", "an", "the" and similar terms used in the context of the present invention are to be construed to cover both the singular and plural unless otherwise indicated herein or clearly contradicted by the context. Further, the terms "including", "containing" and "comprising" are used herein in their open, non-limiting sense. The term "containing" shall include both, "comprising" and "consisting of".

Advantageously, the term "torso of a robot" or "torso" refers to a main body of a robot comprising the logic components for controlling the robot and wherein the limb section or limb is attached to the torso. In particular, wherein the torso might comprise multiple limbs, e.g. for a quadruped robot.

According to a first aspect of the invention, the legged robot, in particular a quadruped robot, comprises a electrostatic chargeable first robot component. Such a first robot component might be a housing of the robot, a circuit component of the robot, a leg of the robot or any individual part attached to the robot or integrated in a torso of the robot.

In addition, the robot comprises at least a first leg and a second leg adapted to walk the robot over the ground, in particular in a manner such that the movements of the first and the second leg are synchronized to mimic an animal-like movement of the legged robot. In particular, the first and the second leg are attached to the torso of the robot.

At least the first leg comprises a first electrostatic discharge assembly. The first electrostatic discharge assembly comprises:
   a first electrostatic discharge contact connected to the first electrostatic chargeable robot component,
   a first electrostatic discharge member extending along the first leg, and
   a first electrostatic discharge foot.

The first electrostatic discharge assembly is adapted to electrostatically discharge the first robot component, therefore to discharge the static electricity of the first robot component, via the first electrostatic discharge contact to the first electrostatic discharge member to the first electrostatic discharge foot and to the ground, in particular in said order.

The electrostatic discharge assembly has the effect of discharging electrostatic charges in a controlled manner, to prevent uncontrolled potential equalisation between the electrostatic chargeable robot components and the environment, in particular also between individual electrostatic chargeable robot components.

Therefore, in an advantageous embodiment of the invention, a respective electrostatic discharge assembly comprises a respective electrostatic discharge contact that is electrically connected to one or more electrostatic chargeable robot components at one end and is further connected to a respective electrostatic discharge member on the other end. In addition, the respective electrostatic discharge member is electrically connected at one end to the respective electrostatic discharge contact and on the other end to the respective first electrostatic discharge foot.

Advantageously, a first end of the first leg that is adapted to be mounted to the torso of the robot corresponds to the first electrostatic discharge contact that is connectable to the electrostatic chargeable first robot component. Further advantageously, the first electrostatic foot corresponds to a second end of the first leg that stands on the ground, wherein the first end of the leg and the second end of the leg are connected by a leg construction that comprises the first electrostatic discharge member that electrostatically connects the first electrostatic discharge contact with first the electrostatic discharge foot. In particular, the first electrostatic discharge member can be the leg construction itself or can be part of the leg construction.

In the intended use of the legged robot, to walk over the ground, the first electrostatic discharge foot of the first leg touches the ground at least once within each walking cycle, in particular of the first leg, to discharge the static electricity of the first robot component.

Advantageously, the term "one walking cycle", in particular one walking cycle has one swing phase (lift off to touch down) and one stance phase (when the foot stays in contact with the ground). The one walking cycle is defined from lift-off to lift-off.

In a further advantageous embodiment of the invention, the second leg of the legged robot comprises a second electrostatic discharge assembly.

The second electrostatic discharge assembly comprises:
a second electrostatic discharge contact connected to the electrostatic chargeable first robot component and/or to a electrostatic chargeable second robot component,
a second electrostatic discharge member extending along the second leg, and
a second electrostatic discharge foot.

The second electrostatic discharge assembly is adapted to electrostatically discharge the first robot component and/or the second robot component via the second electrostatic discharge contact to the second electrostatic discharge member to the second electrostatic discharge foot and to the ground, to electrostatically discharge the first robot component and/or the second robot component.

In a further advantageous embodiment of the invention, in the intended use of the legged robot, to walk over the ground, the second electrostatic discharge foot of the second leg touches the ground at least once within each walking cycle, in particular each walking cycle of the first leg or of the second leg itself, to electrostatically discharge the first robot component and/or the second robot component.

In the intended use of a further advantageous embodiment of the legged robot comprising a first leg and a second leg to walk the legged robot over the ground, the first electrostatic discharge foot of the first leg and/or the second electrostatic discharge foot of the second (2) leg touch the ground. This means that always either the first and/or the second electrostatic discharge foot are in contact with the ground.

Further advantageously for this embodiment, the first electrostatic discharge contact of the first electrostatic discharge assembly of the first leg and the second electrostatic discharge contact of the second electrostatic assembly of the second leg are both connected to the first robot component. In such an embodiment, wherein always one of the first electrostatic discharge foot and/or the second electrostatic discharge foot are touching the ground, the first robot component is always put on ground potential and therefore the risk of electrostatic charging of the first robot component is minimized and might even be kept within defined limits.

In a further advantageous embodiment of the invention, the legged robot comprises additionally to the first and the second leg also a third and/or a fourth leg. Advantageously the movements of the first, second, third and/or fourth leg are synchronized in a manner to mimic an animal-like movement of the legged robot.

Advantageously, each of the first, the second, the third and/or the fourth leg comprises a respective electric discharge assembly. Therefore, such an embodiment comprises the first discharge assembly comprised in the first leg, the second discharge assembly comprised in the second leg, a third discharge assembly comprised in the third leg, and/or a fourth discharge assembly comprised in the fourth leg.

Each of the respective electrostatic discharge assemblies comprises a respective electrostatic discharge contact.

Therefore, such an embodiment comprises the first electrostatic discharge contact comprised in the first leg, the second electrostatic discharge contact comprised in the second leg, a third electrostatic discharge contact comprised in the third leg, and/or a fourth electrostatic discharge contact comprised in the fourth leg.

Each of the respective electrostatic discharge contacts is connected to a respective electrostatic chargeable robot component of the robot. Therefore, such an embodiment might comprise the first electrostatic chargeable robot component, the second electrostatic chargeable robot component, a third electrostatic chargeable robot component and/or a fourth electrostatic chargeable robot component.

In particular, the first, second, third and/or fourth robot component might refer to different components or might refer to the same component, or might refer to different components connected with each other or a mix of these components.

In an advantageous embodiment of the invention, the respective electrostatic chargeable robot components might be individual and different components, they might also refer to the same robot component, e.g. all of the respective electrostatic discharging contacts might connect to the same housing of the robot.

In the intended use of the first, the second, the third and/or the fourth leg to walk such an advantageous embodiment of the legged robot over the ground, an electrostatic foot of the first, the second, the third and/or the fourth leg touches the ground at least once within each walking cycle, to electrostatically discharge the first robot component and/or the second robot component and/or the third robot component and/or the fourth robot component.

In an advantageous embodiment of the invention, each of the first, second, third and/or fourth leg comprises a respective first, second, third and/or fourth electrostatic discharge assembly.

In a further advantageous embodiment of the invention, solely the first leg comprises a respective first electrostatic discharge assembly.

In a further advantageous embodiment of the invention, solely the first and the second leg comprise a respective first and second electrostatic discharge assembly.

In a further advantageous embodiment of the invention, solely the first, the second and the third leg comprise a respective first, second and third electrostatic discharge assembly.

Therefore, it might be that the robot comprises the first, the second, the third and/or the fourth leg, but only the first, the second, the third and/or the fourth leg comprises the respective electrostatic discharge assembly and therefore only the first, the second, the third, and/or the fourth leg is adapted to electrostatically discharge the robot.

In an advantageous embodiment of the invention, the electrostatic discharging assembly achieves the electrostatic discharge (ESD) protection of ESD≤10^12Ω.

A second aspect of the invention refers to a robot leg adapted to walk a robot over a ground. In particular, the robot leg is a first, second, third and/or fourth leg of the legged robot according to the first aspect of the invention.

In a further advantageous embodiment of the robot leg, the leg might be a single standing leg of a robot, adapted to electrically discharging the robot.

The robot leg comprises an electrostatic discharge assembly comprising:
an electrostatic discharge contact (13) connectable to an electrostatic chargeable robot component (100),
an electrostatic discharge member extending along the respective leg (12), and
an electrostatic discharge foot (11).

The electric discharge assembly is adapted to electrostatically discharge the robot component via the electrostatic discharge contact to the electrostatic discharge member to the electrostatic discharge foot and to the ground, in particular in this order.

Advantageously, in the intended use of the robot leg to walk the robot over the ground, the electrostatic discharge foot of the leg touches the ground at least once within each walking cycle, to electrostatically discharge the robot component.

One walking cycle in regard of the robot leg refers to a phase starting when the robot lifts the first leg off the ground, continues while the robot foot is in the air, comes back to the ground and rests on the ground and ends when the robot starts lifting off the robot foot again.

In a further advantageous embodiment of the invention, the robot leg comprises between the electrostatic discharge contact and the electrostatic discharge foot:
- a hip abduction/adduction (HAA) actuator adapted to connect to the robot torso and connecting to a hip flexion/extension (HFE) joint,
- the hip flexion/extension (HFE) joint connecting to a hip flexion/extension (HFE) actuator,
- the hip flexion/extension (HFE) actuator connecting to the upper leg,
- the upper leg connecting to a knee flexion/extension (KFE) actuator,
- the knee flexion/extension (KFE) actuator connecting to a shank,
- the shank connecting to a shank tube, and
- the shank tube is adapted to connect to the robot foot or robot foot adapter which is adapted to connect to the robot foot.

In a further advantageous embodiment, the electrostatic discharge foot comprises an electrostatic discharging material that is selected from a list of an electrostatic discharging elastomer materials, an electrostatic discharging plastic material or any material that comprises electrostatic discharging elements.

In a further advantageous embodiment of the invention, the shell covering the robot leg, in particular the HAA actuator, the HFE joint, the HFE actuator, the upper leg, the KFE actuator, the shank, and/or the shank tube is insulating and the electrostatic discharge assembly is arranged within the insulating shell of the respective part.

In a further advantageous embodiment of the invention, the shell covering the robot leg, in particular the HAA actuator, the HFE joint, the HFE actuator, the upper leg, the KFE actuator, the shank, and/or the shank tube is conductive and the electrostatic discharge assembly is arranged within the conductive shell of the respective part.

A third aspect refers to a use of a first electric discharge assembly for a legged robot, in particular a quadruped robot, wherein the first electric discharge assembly comprises:
- a first electrostatic discharge contact connected to a first electrostatic chargeable robot component,
- a first electrostatic discharge member extending along the first leg, and
- a first electrostatic discharge foot, wherein the first electrostatic discharge assembly is adapted to electrostatically discharge the first robot component via the first electrostatic discharge contact to the first electrostatic discharge member to the first electrostatic discharge foot and to the ground, wherein in the intended use of the legged robot, to walk over the ground, the first electrostatic discharge foot of the first leg touches the ground at least once within each walking cycle, to electrostatically discharge the first robot component.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein:

FIG. 2a shows a schematic of a first electrostatic discharge assembly according to an embodiment of the invention;

FIG. 2b shows a close-up view of FIG. 2a;

MODES FOR CARRYING OUT THE INVENTION

Figure 1:
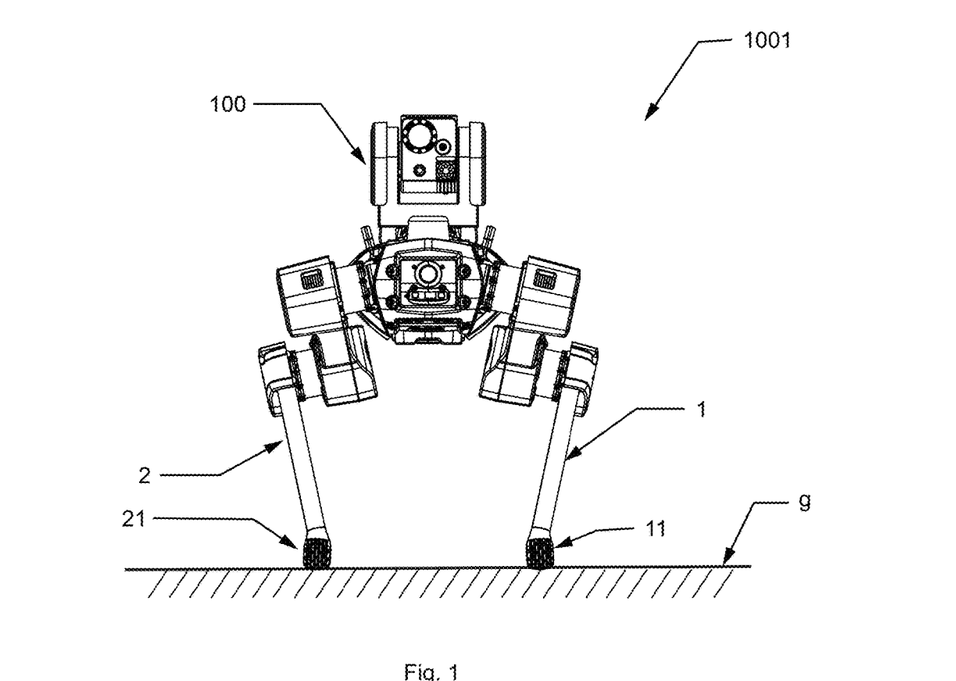
FIG. 1 shows a schematic of a legged robot according to an embodiment of the invention, wherein the legged robot comprises a first leg and a second leg.

FIG. 1 shows a schematic of a legged robot (1001) according to an embodiment of the invention. The legged robot (1001) comprises a first leg (1) and a second leg (2) adapted to walk the robot over a ground (g). The first leg (1) comprises a first electrostatic discharge assembly comprising:
- a first electrostatic discharge contact (13) connected to a first electrostatic chargeable robot component (100),
- a first electrostatic discharge member (12) extending along the first leg (1), and
- a first electrostatic discharge foot (11)

Advantageously, as shown in FIG. 1, the first electrostatic discharge contact (13), the first electrostatic discharge member (12), and the first electrostatic discharge foot (11) are arrange in said order along the first leg (1).

The first electrostatic chargeable robot component (100) is e.g. as shown here, the housing of the robot. Even if this is not shown here, the first electrostatic chargeable robot component (100) might further refer to any chargeable component inside or attached to the robot or robot torso or any of the robot legs. In particular, it can also refer to a LiDAR attached to the robot.

The first electrostatic discharge assembly is adapted to electrostatically discharge the first robot component (100) via the first electrostatic discharge contact (13) to the first electrostatic discharge member (12) to the first electrostatic discharge foot (11) and to the ground (g).

In the intended use of the legged robot (1001), to walk over the ground (g), the first electrostatic discharge foot (11) of the first leg (1) touches the ground (g) at least once within each walking cycle, to electrostatically discharge the first robot component (100).

In a further advantageous embodiment of the legged robot (1001) as shown in FIG. 1, the second leg (2) comprises a second electrostatic discharge assembly. The second electrostatic discharge assembly comprises:
- a second electrostatic discharge contact connected to the electrostatic chargeable first robot component (100) and/or to a electrostatic chargeable second robot component,
- a second electrostatic discharge member extending along the second leg (2), and a second electrostatic discharge foot (21).

The second electrostatic discharge assembly is adapted to electrostatically discharge the first robot component (100) and/or the second robot component via the second electrostatic discharge contact to the second electrostatic discharge foot (21) and to the ground (g), for the purpose to discharge the first robot component (100) and/or the second robot component.

In a further advantageous embodiment of the legged robot (1001) as shown in FIG. 1, in the intended use of the legged robot (1001) to walk over the ground (g), the second electrostatic discharge foot (21) of the second leg (2) touches the ground (g) at least once within each walking cycle, to electrostatically discharge the first robot component (100) and/or the second robot component.

In a further advantageous embodiment of the legged robot (1001), in the intended use of the legged robot (1001), to walk over the ground (g), the first electrostatic discharge foot of the first leg (1) and/or the second electrostatic discharge foot of the second leg (2) is touching the ground (g). Since always at least one leg touches the ground (g), the electrostatic chargeable robot component and/or the second electrostatic chargeable robot component are always on ground potential and therefore, any charging of the robot component and/or the second robot component is prohibited. This might be in particular be the case in walking mode.

In addition, in a further embodiment of the legged robot (1001), it might further be that the first electrostatic discharge contact of the first electrostatic discharge assembly of the first leg and the second electrostatic discharge contact of the second electrostatic assembly of the second leg are both connected to the first robot component (100), e.g. the robot torso.

In particular, in a setting where always either the first electrostatic discharge assembly or the second electrostatic discharge assembly or both are touching the ground (d), the first electrostatic chargeable robot component (100) is always on ground potential and therefore a static charging of the first robot component is prohibited.

Figure 2:
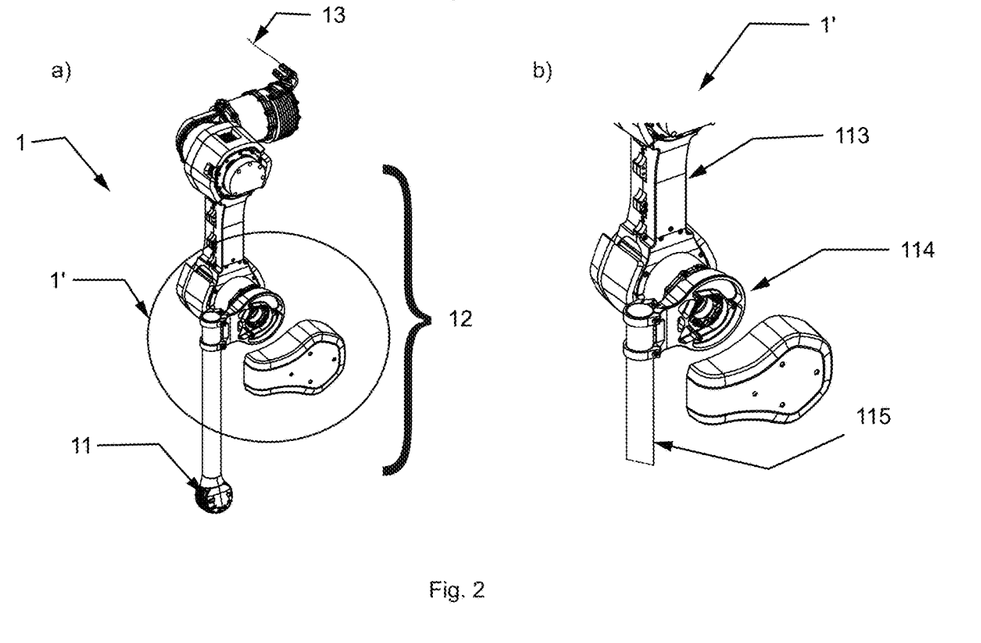

FIG. 2a discloses an embodiment of the first electrostatic discharge assembly or the second electrostatic discharge assembly or any other electrostatic discharge assembly. The first electrostatic discharge assembly comprises a first electrostatic discharge contact (13) that might be any contact that electrically connects the electrostatic discharge assembly to the first electrostatic chargeable component (100). In addition, the electrostatic discharge assembly comprises further a first electrostatic discharge member (12) extending along the first leg (1). In particular, such a first electrostatic discharge member (12) might comprise several electrical passages (e.g. shown in close-up view FIG. 2b) between individual parts of the first leg (1) that are mounted together to form the first leg (1).

Advantageously, the first discharge assembly is used for a legged robot.

FIG. 2b shows a close-up view of a section of the first leg 1' showing a knee flexion/extension actuator (116) between an upper leg (113) of a first leg (1) and a shank (114) of the first leg. The electrostatic passage through the shank (114) is realized by means of screw connections as shown in FIG. 2b. This is an example, how an embodiment of a first electrostatic discharge assembly or in particular a first electrostatic discharge member (12) can be realized.

Advantageously, a cable shield integrated into the shank (114) can adapted to provide the electrostatic passage.

Further advantageously, the casing of the upper leg (113), the knee flexion/extension actuator (116), the shank (114) and the shank tube (115) comprises aluminium that is anodized and therefore not conductive. The electrostatic passage happens through the core material of the aluminium part and the connecting and conductive metallic screws.

Further examples, how the electrical passage through the electrostatic discharge assembly or in particular through the electrostatic discharge member can be realized are by means of metal clamps, metal interconnection or any other conductive material fastening parts (e.g. conductive screws, conductive clamps, conductive O-rings etc.).

Figure 3:
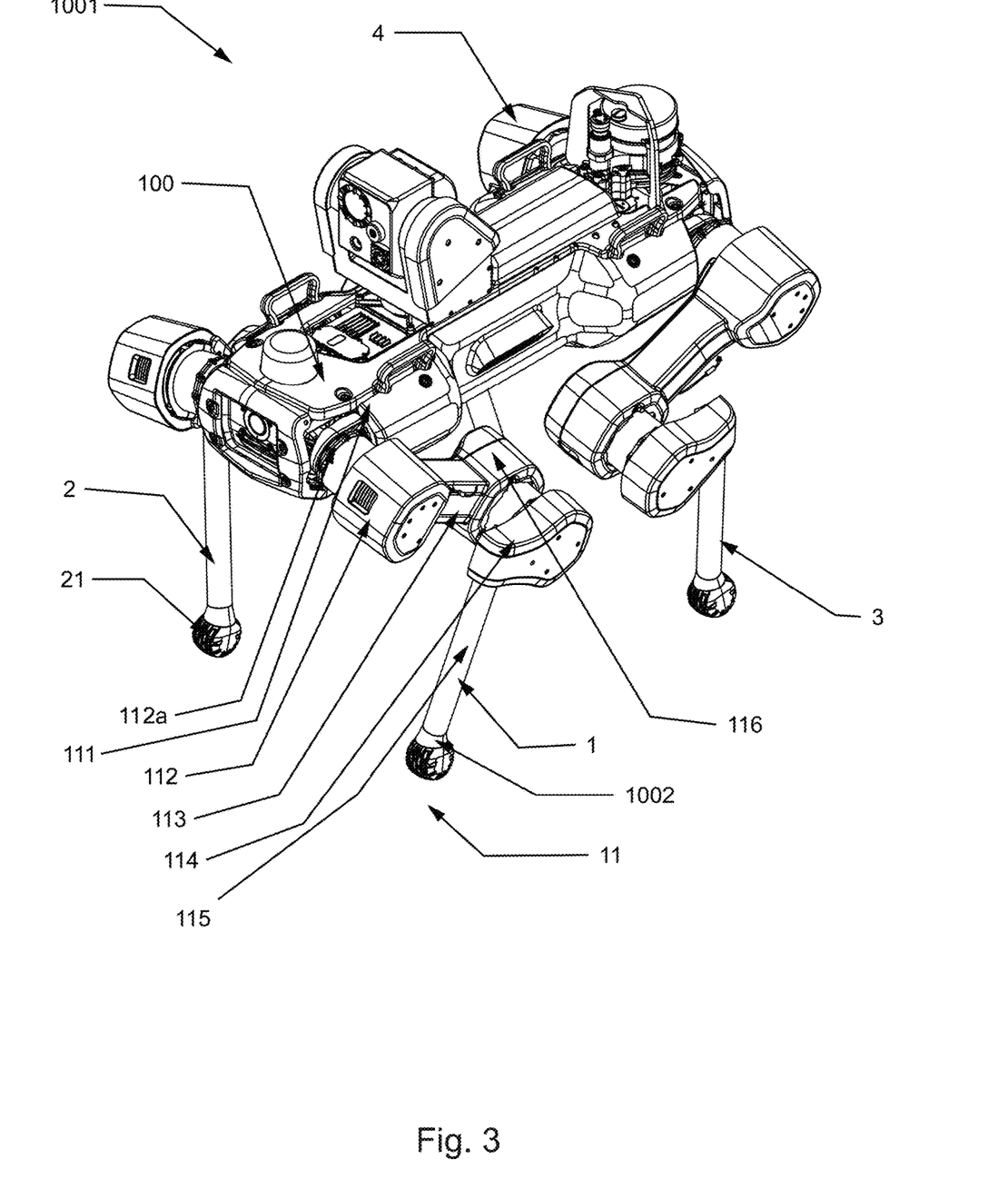
FIG. 3 shows a schematic of a legged robot according to a further embodiment of the invention, wherein the legged robot comprises a first, a second, a third and a fourth leg.

FIG. 3 shows an embodiment of the invention comprising in addition to the first leg (1) and the second leg (2) further a third leg (3) and a fourth leg (4). The four legs (1, 2, 3, 4) are adapted to walk the legged robot (1001) over a ground. In particular, the first (1), second (2), third (3) and fourth (4) leg are adapted to move in a synchronized manner to walk the robot in an animal-like locomotion over the ground (g).

Each of the first (1), second (2), third (3), and/or fourth (4) leg comprises a respective first, second, third and/or fourth electrostatic discharge assembly.

In an advantageous embodiment of the invention, each of the first (1), second (2), third (3) and/or fourth (4) leg comprises a respective first, second, third and/or fourth electrostatic discharge assembly.

In a further advantageous embodiment of the invention, solely the first leg (1) comprises a respective first electrostatic discharge assembly.

In a further advantageous embodiment of the invention, solely the first (1) and the second (2) leg comprise a respective first and second electrostatic discharge assembly.

In a further advantageous embodiment of the invention, solely the first (1), the second (2) and the third (3) leg comprise a respective first, second and third electrostatic discharge assembly.

Each of the respective first, second, third, and/or fourth electrostatic discharge assembly comprises a respective first (13), second, third, and/or fourth electrostatic discharge contact.

Each of the respective first (13), second, third, and/or fourth electrostatic discharge contacts is in contact with a respective first (100), second, third, and/or fourth electrostatic chargeable robot component.

This means for example, that it would be possible that both, the first and the second electrostatic discharge contact connect both to the first and second electrostatic chargeable robot component, or to the first and the third robot component, or to the first and the fourth robot component. Or that it would be possible that both, the first and the third electrostatic discharge contact connect both to the first and third electrostatic chargeable robot component, or to the second and the third robot component, or to the second and the fourth robot component. Or that it would be possible that both, the first and the fourth electrostatic discharge contact connect both to the first and fourth electrostatic chargeable robot component, or to the second and fourth robot component or to the third and fourth robot component. Or that it would be possible that both, the second and the third electrostatic discharge contact connect both to the second and third electrostatic chargeable robot component. Or any other combination would be possible where the first, the second, the third and/or the fourth electrostatic discharge contact connect with one or more of the first, the second, the third and/or the fourth electrostatic chargeable robot component.

In the intended use of the legged robot (1001) to walk over the ground (g), a first (11), second (21), third (31) or fourth (41) electrostatic foot of the respective first, second, third or fourth electrostatic discharge assembly touches the ground (g) at least once within each walking cycle, to electrostatically discharge the respective first (100), second, third, and/or fourth robot component.

In particular, the first (100), second, third and/or fourth robot component might be the same component or they might be individual components or components connected with each other or a mix thereof.

In particular, e.g. the first electronic discharge assembly and the second electronic discharge assembly might be connected to the same first robot component.

In a further advantageous embodiment of the invention as shown in FIG. 3, The first leg (1) might comprise between the first electrostatic discharge contact (13) and the electrostatic discharge foot (11):
- a first hip abduction/adduction actuator (111) adapted to connect to the robot torso and connecting to a first hip flexion/extension joint (112a),
- the first hip flexion/extension joint (112a) connecting to a first hip flexion/extension actuator (112),
- the first hip flexion/extension actuator (112) connecting to the first upper leg (113),
- the first upper leg (113) connecting to a first knee flexion/extension actuator (116),
- the first knee flexion/extension actuator (116) connecting to a first shank (114), the first shank (114) connecting to a first shank tube (115), and
- the first shank tube (115) is adapted to connect to the first robot foot (11) or first robot foot adapter (1002) which is adapted to connect to the first electrostatic discharge robot foot (11) of the first leg.

In particular, each of the first, second, third and/or fourth leg might comprise between the respective electrostatic discharge contact (13) and the electrostatic discharge foot (11):
- a respective hip abduction/adduction actuator (111) adapted to connect to the robot torso and connecting to a respective hip flexion/extension joint (112a),
- the respective hip flexion/extension joint (112a) connecting to a respective hip flexion/extension actuator (112),
- the respective hip flexion/extension actuator (112) connecting to the respective upper leg (113),
- the respective upper leg (113) connecting to a respective knee flexion/extension actuator (116),
- the respective knee flexion/extension actuator (116) connecting to a respective shank (114),
- the respective shank (114) connecting to a respective shank tube (115), and
    - the respective shank tube (115) is adapted to connect to the respective robot foot (11) or respective robot foot adapter (1002) which is adapted to connect to the respective electrostatic discharge robot foot (11) of the respective leg.

Figure 4:
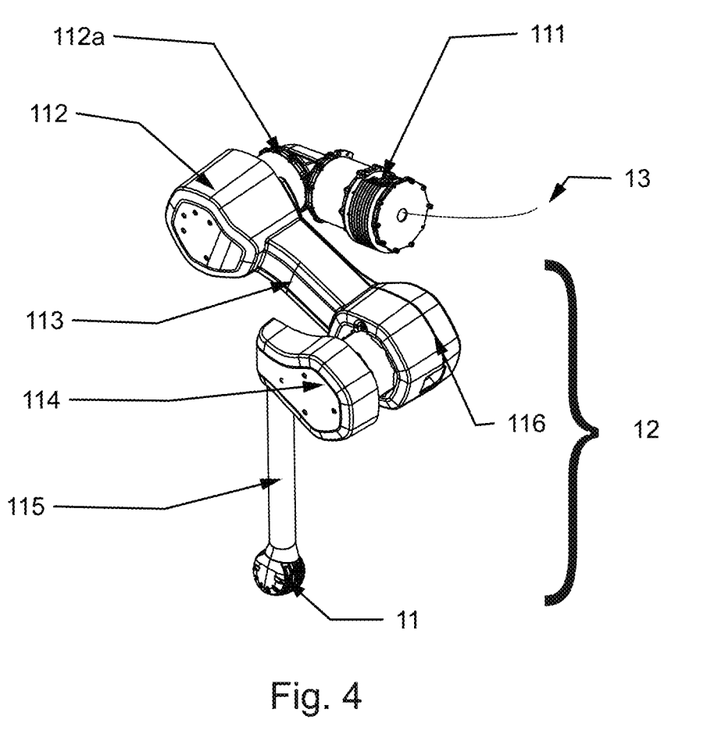
FIG. 4 shows a schematic of a robot leg according to an embodiment of the invention.

FIG. 4 shows an embodiment of a robot leg (1) according to a second aspect of the invention, adapted to walk the robot (1001) over the ground (g). The robot leg comprises an electrostatic discharge assembly comprising:
- an electrostatic discharge contact (13) connectable to an electrostatic chargeable robot component (100),
- an electrostatic discharge member extending along the respective leg (12), and
- an electric discharge foot (11).

The electric discharge assembly is adapted to electrostatically discharge the robot component (100) via the electrostatic discharge contact (13) to the electrostatic discharge member (12) to the electrostatic discharge foot (11) and to the ground (g).

In the intended use of the robot leg (1) to walk the robot (1001) over the ground (g), the electrostatic discharge foot (11) of the leg (1) touches the ground (g) at least once within each walking cycle, to electrostatically discharge the robot component (100).

In a further advantageous embodiment of the robot leg (1) as shown in FIG. 4, the leg (1) between the electrostatic discharge contact (13) and the electrostatic discharge foot (11) is arranged
- a hip abduction/adduction actuator (111) adapted to connect to the robot torso and connecting to a hip flexion/extension joint (112a),
- the hip flexion/extension joint (112a) connecting to
- the flexion/extension actuator (112),
- the hip flexion/extension actuator connecting to the upper leg (113),
- the upper leg (113) connecting to the knee flexion/extension actuator (116),
- the knee flexion/extension actuator (116) connecting to a shank (114),
- the shank (114) connecting to a shank tube (115), and
- the shank tube (115) adapted to connect to the robot foot (11) or robot foot adapter (1002).

In a further advantageous embodiment of the robot leg (1) as shown in FIG. 4, the electrostatic discharge foot (11) comprises an electrostatic dischargeable foot material, e.g. an electrostatic dischargeable elastomer.

The invention claimed is:

1. A legged robot, in particular a quadruped robot, comprising at least a first leg and a second leg adapted to walk the robot over a ground,
   wherein the first leg comprises a first electrostatic discharge assembly comprising:
   a first electrostatic discharge contact connected to a first electrostatic chargeable robot component,
   a first electrostatic discharge member extending along the first leg, and
   a first electrostatic discharge foot,
   wherein the first electrostatic discharge assembly is adapted to electrostatically discharge the first robot component via the first electrostatic discharge contact to the first electrostatic discharge member to the first electrostatic discharge foot and to the ground,
   wherein in the intended use of the legged robot, to walk over the ground, the first electrostatic discharge foot of the first leg touches the ground at least once within each walking cycle, to electrostatically discharge the first robot component.

2. The legged robot according to claim 1, wherein the second leg comprises a second electrostatic discharge assembly comprising:
   a second electrostatic discharge contact connected to the electrostatic chargeable first robot component and/or to a electrostatic chargeable second robot component,
   a second electrostatic discharge member extending along the second leg, and
   a second electrostatic discharge foot,
   wherein the second electrostatic discharge assembly is adapted to electrostatically discharge the first robot component and/or the second robot component via the second electrostatic discharge contact to the second electrostatic discharge member to the second electrostatic discharge foot and to the ground, to electrostatically discharge the first robot component and/or the second robot component.

3. The legged robot according to claim 2, wherein in the intended use of the legged robot, to walk over the ground, the second electrostatic discharge foot of the second leg touches the ground at least once within each walking cycle, to electrostatically discharge the first robot component and/or the second robot component.

4. The legged robot according to claim 2, wherein in the intended use of the legged robot, to walk over the ground, the first electrostatic discharge foot of the first leg and/or the second electrostatic discharge foot of the second leg is touching the ground.

5. The legged robot according to claim 1, wherein the first electrostatic discharge contact of the first electrostatic discharge assembly of the first leg and the second electrostatic discharge contact of the second electrostatic assembly of the second leg are both connected to the first robot component.

6. The legged robot according to claim 1 comprising further a third and a fourth leg adapted to walk the robot over a ground,
- wherein each of the first, second, third and/or fourth leg comprises a respective first, second, third and/or fourth electrostatic discharge assembly,
- wherein each of the respective first, second, third, and/or fourth electrostatic discharge assembly comprises a respective first, second, third, and/or fourth electrostatic discharge contact,
- wherein each of the respective first, second, third, and/or fourth electrostatic discharge contacts is in contact with a respective first, second, third, and/or fourth electrostatic chargeable robot component,
- wherein in the intended use of the legged robot to walk over the ground, a first, second, third and/or fourth electrostatic foot of the respective first, second, third and/or fourth electrostatic discharge assembly touches the ground at least once within each walking cycle, to electrostatically discharge the respective first, second, third, and/or fourth robot component.

7. The legged robot according to claim 1, wherein the electrostatic discharging assembly requires the electrostatic discharge protection of $ESD \leq 10^{12} \, \Omega$.

8. A robot leg adapted to walk a robot over a ground comprises an electrostatic discharge assembly comprising:
- an electrostatic discharge contact connectable to an electrostatic chargeable robot component,
- an electrostatic discharge member extending along the respective leg, and
- an electrostatic discharge foot,
  - wherein the electric discharge assembly is adapted to electrostatically discharge the robot component via the electrostatic discharge contact to the electrostatic discharge member to the electrostatic discharge foot and to the ground,
  - in particular, wherein in the intended use of the robot leg to walk the robot over the ground, the electrostatic discharge foot of the leg touches the ground at least once within each walking cycle, to electrostatically discharge the robot component.

9. The robot leg according to claim 8, wherein between the electrostatic discharge contact and the electrostatic discharge foot is arranged
- a hip abduction/adduction actuator adapted to connect to the robot torso and connecting to a hip flexion/extension joint,
- the hip flexion/extension joint connecting to a hipflexion/extension actuator,
- the hip flexion/extension actuator connecting to the upper leg,
- the upper leg connecting to a knee flexion/extension actuator,
- the knee flexion/extension actuator connecting to a shank,
- the shank connecting to a shank tube, and
- the shank tube is adapted to connect to the robot foot or robot foot adapter which is adapted to connect to the robot foot.

10. Use of a first electric discharge assembly for a legged robot, in particular a quadruped robot, wherein the first electric discharge assembly comprises:
- a first electrostatic discharge contact connected to a first electrostatic chargeable robot component,
- a first electrostatic discharge member extending along the first leg, and
- a first electrostatic discharge foot,
  - wherein the first electrostatic discharge assembly is adapted to electrostatically discharge the first robot component via the first electrostatic discharge contact to the first electrostatic discharge member to the first electrostatic discharge foot and to the ground, wherein in the intended use of the legged robot, to walk over the ground, the first electrostatic discharge foot of the first leg touches the ground at least once within each walking cycle, to electrostatically discharge the first robot component.

* * * * *